United States Patent
Allan et al.

(10) Patent No.: US 9,178,799 B2
(45) Date of Patent: Nov. 3, 2015

(54) METHOD AND SYSTEM OF SHORTEST PATH BRIDGING (SPB) ENHANCED RESILIENCE WITH LOOP MITIGATION

(71) Applicant: Telefonaktiebolaget L M Ericsson (publ), Stockholm (SE)

(72) Inventors: David Ian Allan, San Jose, CA (US); Panagiotis Saltsidis, Stockholm (SE); János Farkas, Kecskemét (HU); András Császár, Budapest (HU); Evgeny Tantsura, Palo Alto, CA (US)

(73) Assignee: TELEFONAKTIEBOLAGET L M ERRICSSON (PUBL), Stockholm (SE)

( * ) Notice: Subject to any disclaimer, the term of this patent is extended or adjusted under 35 U.S.C. 154(b) by 171 days.

(21) Appl. No.: 13/757,532

(22) Filed: Feb. 1, 2013

(65) Prior Publication Data
US 2014/0219275 A1 Aug. 7, 2014

(51) Int. Cl.
*H04L 12/761* (2013.01)
*H04L 12/721* (2013.01)
*H04L 12/705* (2013.01)
(Continued)

(52) U.S. Cl.
CPC ........... *H04L 45/16* (2013.01); *H04L 45/18* (2013.01); *H04L 45/28* (2013.01); *H04L 45/48* (2013.01); *H04L 45/66* (2013.01)

(58) Field of Classification Search
CPC ......... H04L 45/16; H04L 45/66; H04L 45/48; H04L 45/28; H04L 45/18; H04L 12/4641; H04L 45/50; H04L 12/4625; H04L 49/354; H04L 49/3009; H04L 45/04
See application file for complete search history.

(56) References Cited

U.S. PATENT DOCUMENTS 6,857,027 B1 2/2005 Lindeborg et al.
8,885,643 B2 * 11/2014 Mack-Crane et al. ........ 370/390
(Continued)

FOREIGN PATENT DOCUMENTS

WO  WO-2007038856 A1  4/2007

OTHER PUBLICATIONS

Atlas, A. et al., "Basic Specification for IP Fast Reroute: Loop-Free Alternates," Sep. 2008, 31 pages, Network Working Group, Request for Comments: 5286, The IETF Trust.
(Continued)

*Primary Examiner* — Yee Lam
(74) *Attorney, Agent, or Firm* — Nicholson De Vos Webster & Elliott LLP

(57) ABSTRACT

A method forward Ethernet frames at a node in a network supporting an implementation of shortest path bridging (SPB) protocol is disclosed. The method starts with a shortest path computation for the node (referred to as the computing node). The shortest path computation selects at least a shortest path to each destination node in the network, where a neighboring node on the shortest path to reach each node is recorded. Then it computes a downstream loop-free alternate (LFA) node for a destination node, where the LFA node is downstream of the computing node but not on the selected shortest path to the destination node from the computing node. Then when connectivity to the neighboring node on the computed shortest path is detected to be abnormal, the node forwards an Ethernet frame with a destination media access control (MAC) address corresponding to the destination node through the LFA node.

8 Claims, 10 Drawing Sheets

(51) Int. Cl.
  *H04L 12/703*  (2013.01)
  *H04L 12/753*  (2013.01)

(56) References Cited

U.S. PATENT DOCUMENTS

| | | | | |
|---|---|---|---|---|
| 2005/0169270 A1* | 8/2005 | Mutou et al. | ................ | 370/390 |
| 2010/0272108 A1* | 10/2010 | Mack-Crane et al. | ........ | 370/392 |
| 2011/0310904 A1* | 12/2011 | Gero et al. | ................ | 370/401 |
| 2012/0044837 A1 | 2/2012 | Ibanez Fernandez et al. | | |
| 2013/0188645 A1* | 7/2013 | Mack-Crane | ................ | 370/392 |
| 2014/0369352 A1* | 12/2014 | Zhou | ................ | 370/390 |

OTHER PUBLICATIONS

Farkas, Janos et al., "Performance Analysis of Shortest Path Bridging Control Protocols," Nov. 30, 2009, 6 pages, IEEE "GLOBECOM" 2009.

Fedyk, Don et al., "Provider Link State Bridging (PLSB)," Jan. 2007, 10 pages, Nortel Networks.

Shand, M. et al., "IP Fast Reroute Framework," Jan. 2010, 15 pages, Internet Engineering Task Force (IETF), Request for Comments: 5714, IETF Trust and the persons identified as the document authors.

"IEEE Standard for Local and metropolitan area networks—Virtual Bridged Local Area Networks Amendment 8: Management Information Base (MIB) Definitions for VLAN Bridges," IEEE Std 802.1ap™-2008, 327 pages, IEEE Computer Society.

"IEEE Standard for Local and metropolitan area networks—Media Access Control (MAC) Bridges and Virtual Bridged Local Area Networks—Amendment 20: Shortest Path Bridging," IEEE Std 802.1aq™-2012, 340 pages, IEEE Computer Society.

* cited by examiner

| Destination Node | N20 | N21 | ... | N32 |
|---|---|---|---|---|
| Upstream Ports Facing Nodes | N9, N10 | N9, N12 | ... | N9, N10 |
| Non-Upstream Ports Facing Nodes | N11, N12 | N10, N11 | ... | N11, N12 |

METHOD AND SYSTEM OF SHORTEST PATH BRIDGING (SPB) ENHANCED RESILIENCE WITH LOOP MITIGATION

FIELD

The embodiments of the invention are related to the field of frame forwarding in an Ethernet network. More specifically, the embodiments of the invention relate to a method and system for enhancing the resilience of connectivity with loop mitigation in an Ethernet network supporting an implementation of shortest path bridging (SPB) protocol.

BACKGROUND

Today Ethernet is the dominant computer networking technology for local area networks (LANs). As Ethernet gains wide popularity among enterprise, carriers, and cloud service providers, Ethernet architecture has transitioned LAN segments from being implemented as passive shared mediums only to being implemented as actively switched networks. In an actively switched network for Ethernet, resilient loop free frame forwarding is essential for efficient data communication, and shortest path bridging (SPB) protocol is the latest evolutionary step in Ethernet networking that has been standardized. On Mar. 29, 2012, the Institute of Electrical and Electronic Engineers Review Committee (IEEE RevCom) approved 802.1aq standards for SPB protocols.

SPB introduces link state routing to Ethernet to replace the distance vector algorithm underlying the Rapid Spanning Tree Protocol (RSTP, standardized as IEEE 802.1D), and uses multiple sets of edge rooted shortest path trees in lieu of a single or small number of spanning trees. A node in a SPB network maintains sets of shortest path trees so that the node knows how to forward frames to other nodes in the network. By definition, an Ethernet node does not forward a frame back to the port of arrival in frame forwarding (sometimes referred to as "reverse poisoning") to avoid forwarding loops. Yet forwarding loop may still happen in an SPB network with reverse poisoning enabled. For example, forwarding loop may occur upon distance inversion. The simplest form of a distance inversion is when two nodes each believe the other is closer to a destination node thus frame destined to the destination node will be forwarded back and forth between the two nodes. Poisoned reverse means such a loop cannot happen in Ethernet, but loops caused by lack of synchronization of multiple switches creating distance inversion scenarios can demonstrably occur.

Forwarding loop causes chronic drain on network bandwidth. Worse, for multicast frame forwarding, forwarding loop can be catastrophic, especially if a loop feeds back into another loop, resulting in an exponential increase in the bandwidth consumed in the network, and causing nearly instantaneous network "meltdown." For this and other reasons, loop prevention is critical for a SPB network.

Shortest path bridging as specified is augmented with a reverse path forwarding check (RPFC, which is referred to as ingress checking in IEEE 802.1aq). Ingress checking (also referred to as ingress check or source address lookup) checks the source MAC address of a given Ethernet frame with the expected port of arrival for that address. If there is a discrepancy the frame is discarded. This adds robustness to loop mitigation but is not authoritative hence is augmented with a control plane handshake to specifically prevent loops when multiple switches are not synchronized. What the addition of the strictness of RPFC does is restrict resiliency options as nodes cannot "blindly" exploit alternate forwarding paths to a given destination, because with RPFC, only one path from a source is permitted by any given node in any given backbone virtual LAN identifier (B-VID). What would be desirable would be to have more relaxed forms of loop mitigation for 802.1aq such that in failure scenarios fast local switching to loop free alternate paths could be exploited.

SUMMARY

A method forward Ethernet frames at a node in a network supporting an implementation of shortest path bridging (SPB) protocol is disclosed. The node contains a filtering database (FDB) to guide Ethernet frame forwarding, and the FDB update is coordinated through a digest exchange between the node and one or more neighboring nodes upon either node initialization or a topology change of the network. The method starts with a shortest path computation by the node (referred to as the computing node). The shortest path computation selects one shortest path to each destination node in the network as specified in 802.1aq, where a neighboring node on the shortest path to reach each node is recorded. Then it computes a downstream loop-free alternate (LFA) node for a destination node, if one exists, where the LFA node is downstream of the computing node, but not on the selected shortest path to the destination node from the computing node and the computing node has an existing database digest agreement with the LFA node, such that forwarding Ethernet frame from the computing node to the destination node through the LFA node is known to not cause a forwarding loop. Being downstream means the LFA node is closer to the destination node than the computing node, and the presence of a digest agreement means both nodes agree on their relative position with respect to the destination. Thus when connectivity to the neighboring node on the computed shortest path is detected to be in an abnormal state due to link or node failure, the node may then forward any unicast Ethernet frame for the Backbone-VID (B-VID) associated with the shortest path and with a destination media access control (MAC) address corresponding to the destination node through the LFA node with confidence that a loop will not form.

For such a technique to work, the currently specified RPFC (also known as ingress checking) must be modified to permit the use of loop free alternates without RPFC based frame discard. This is achieved by relaxing RPFC for unicast frames only. The method starts with determining whether a received Ethernet frame from a port of the node (a "receiving port" of the Ethernet frame) is a multicast frame. If the received Ethernet frame is a multicast frame, then the method determines whether in the FDB the source MAC address or the VID of the Ethernet frame has a matching MAC address or a matching VID. A determined multicast Ethernet frame is processed for frame forwarding if there is a match, otherwise it is discarded. If the received frame is determined not to be a multicast frame, the received frame is sent for an alternate ingress check processing.

The technique of relaxation of the strictness of RPFC for unicast does increase the possibility of a unicast loop forming in multiple failure scenarios. Additional filtering may make this more robust in the form of an admissible port map for receipt of frames with a given destination MAC address (note that this is independent of the VID in the frame as the overall topology is common to all VIDs, although this would need to be reconsidered for multi-topology, necessitating a distinct admissible port map per topology instance). The admissible port map would be programmed on the basis of both the determination of the node associated with acceptable ports in the map being upstream of the computing node, and digest agreement with that node currently existed. Upon a failure in the network, rules would exist to permit pruning of the port map to remove candidate upstream nodes for which the risk of a loop became unacceptable.

A network device configured to be a node in a network supporting an implementation of SPB protocol is disclosed. The network device comprises a frame processor. The frame processor includes a path computing processor configured to select one shortest path to each destination node in the network, the path computing processor further configured to compute a loop-free alternate (LFA) node for a destination node, the LFA node is downstream of the network device but not on the selected shortest path to the destination node from the network device and that network device has an existing database digest agreement with the LFA node, such that forwarding Ethernet frame from the network device to the destination node through the LFA node is known not to cause a forwarding loop. The frame processor includes a loop free alternative (LFA) records configured to record the determination of acceptable LFA nodes by the path computing processor, a filtering database (FDB) configured to contain a plurality of mappings of ports to MAC addresses, and a frame forwarding processor configured to forward an Ethernet frame with a destination media access control (MAC) address corresponding to the destination node through the LFA node when connectivity to the neighboring node on the shortest path is detected to be in an abnormal state. The network device also comprises a multicast frame detector configured to determine whether a received Ethernet frame is a multicast frame. If the received frame is not a multicast frame, it is forwarded without an RPFC check known in the art but with an alternate process referred to as alternate ingress check processing. If the received Ethernet frame is a multicast frame, the RPFC check is performed as known in the art; the multicast frame detector is further configured to examine the source MAC address of the received Ethernet frame to determine if the receiving port for the Ethernet frame corresponds to that expected in the FDB (which would also be the port that frames addressed to the MAC address would be sent). The multicast frame detector discards the received Ethernet frame in response to determination that no matching MAC address for the receiving port is found in the FDB. Additionally the network device comprises a connectivity module configured to monitor connectivity of the nodes to neighboring nodes.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to affect such feature, structure, or characteristic in connection with other embodiments whether or not explicitly described.

DETAILED DESCRIPTION

Figure 1A:
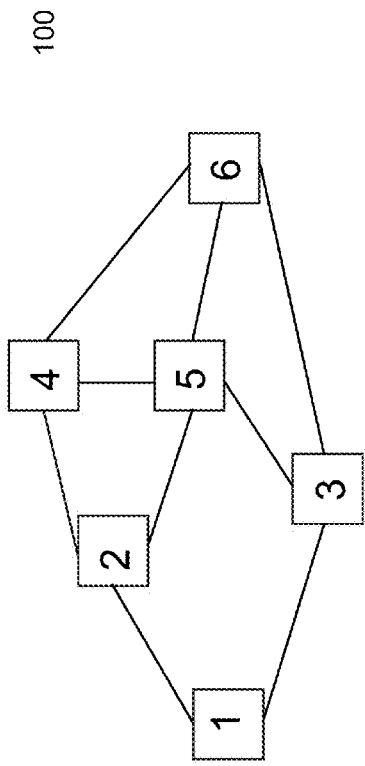
FIG. 1A is a block diagram illustrating one embodiment of a network configuration supporting shortest path bridging (SPB) protocol.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The operations of the flow diagram will be described with reference to the exemplary embodiment of FIG. 10. However, it should be understood that the operations of flow diagrams can be performed by embodiments of the invention other than those discussed with reference to FIGS. 4-7, and 9, and the embodiments discussed with reference to FIG. 10 can perform operations different than those discussed with reference to the flow diagrams of FIGS. 4-7, and 9.

As used herein, a network device (e.g., a router, switch, and bridge) is a piece of networking equipment, including hardware and software that communicatively interconnects other equipment on the network (e.g., other network devices, end systems). Some network devices are "multiple services network devices" that provide support for multiple networking functions (e.g., routing, bridging, VLAN (virtual LAN) switching, Layer 2 aggregation, session border control, Quality of Service, and/or subscriber management), and/or provide support for multiple application services (e.g., data, voice, and video). Subscriber end systems (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end systems (e.g., server end systems) belonging to a service or content provider or end systems participating in a peer to peer service, and may include, for example, public webpages (e.g., free content, store fronts, search services), private webpages (e.g., username/password accessed webpages providing email services), and/or corporate networks over VPNs. Typically, subscriber end systems are coupled (e.g., through customer premise equipment coupled to an access network (wired or wirelessly)) to edge network devices, which are coupled (e.g., through one or more core network devices) to other edge network devices, which are coupled to other end systems (e.g., server end systems). A network device is generally identified by its media access (MAC) address, Internet protocol (IP) address/subnet, network sockets/ports, and/or upper OSI layer identifiers.

Network devices are commonly separated into a control plane and a data plane (sometimes referred to as a forwarding plane or a media plane). In the case that the network device is a switch/bridge (or is implementing bridge functionality), the control plane typically determines how a frame (e.g., Ethernet frame) is to be forwarded (e.g., the next hop for the frame and the outgoing port for that frame), and the data plane is in charge of forwarding that frame. For example, the control plane typically includes one or more forwarding/routing protocols (e.g., Border Gateway Protocol (BGP), Interior Gateway Protocol(s) (IGP) (e.g., Open Shortest Path First (OSPF), Routing Information Protocol (RIP), Intermediate System to Intermediate System (IS-IS)), Label Distribution Protocol (LDP), Resource Reservation Protocol (RSVP)) that communicate with other network devices to exchange paths and select those paths based on one or more metrics. Note that embodiments of this invention also apply where the control plane and data plane are in separate network devices.

Different embodiments of the invention may be implemented using different combinations of software, firmware, and/or hardware. Thus, the techniques shown in the figures can be implemented using code and data stored and executed on one or more electronic devices (e.g., an end system, a network device). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

TERMS

The following terms are used in the description.

Unicast: Sending a frame to a single destination node identified by a unique individual MAC address.

Multicast: Sending a frame to a plurality of destination node simultaneously from a single source node where a unique group MAC address identifies the set of recipients.

Root: A root node (or "root") is the central node (also referred to as the topmost node) of a spanning tree or shortest path tree. For unicast frame forwarding, the root is the destination node. In contrast, for multicast frame forwarding, the root is the source node.

Upstream node: For a node computing unicast frame forwarding paths (referred to as the "computing node," an upstream node is a node that is further to a root than the computing node.

Downstream node: For unicast, a downstream node is a node that is closer to a root than the computing node.

Shortest path bridging—VLAN mode (SPBV): A type of SPB that is VLAN based, i.e., each shortest path tree being defined by a different VLAN Identifier (VID).

Shortest path bridging—MAC mode (SPBM): Another type of SPB in which the shortest path trees are MAC based, i.e., each shortest path tree being identified by a unique MAC address or an abbreviated form of MAC address. VLANs are used to delineate multipath variations.

Equal cost tree (ECT): Sometimes referred to as equal cost multi-tree (ECMT). When multiple equal-cost routes to a root exist, each shortest path tree is an ECT to the root. A node in a SPB network uses specified tie breaking algorithms in the construction of a specific ECT. An ECT set is identified by an ECT algorithm and VLAN is associated with a unique ECT-algorithm in one embodiment.

Network Configuration

FIG. 1A is a block diagram illustrating one embodiment of a network configuration supporting shortest path bridging (SPB) protocol. Network 100 contains six nodes, N1-N6. The six nodes are interconnected forming a mesh topology. Note network 100 is a simplification of an operating SPB network in the real world. A SPB network may scale up to thousands of nodes and provide millions of unique services. Indeed, a SPB MAC mode network complying with IEEE 802.1aq is capable of supporting up to 16 million unique services within a backbone VLAN. Thus, network 100 is used only to illustrate embodiments of frame forwarding according to the invention, and the principles underlying herein apply to much larger networks.

Figure 1B:
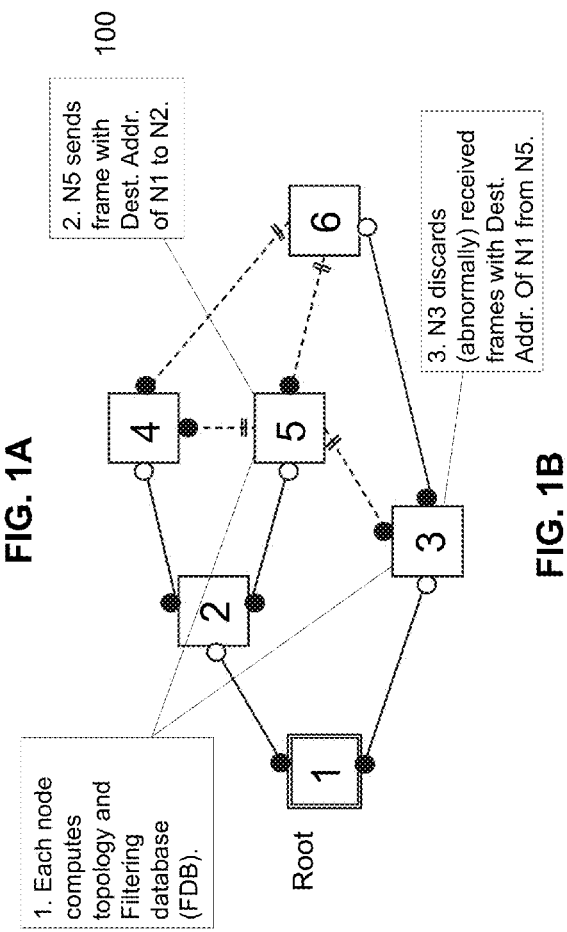
FIG. 1B is a block diagram illustrating one embodiment of SPB frame forwarding according to one embodiment of the invention.

FIG. 1B is a block diagram illustrating SPB frame forwarding according to one embodiment of the invention. Task boxes 1-3 illustrate the order in which operations are performed. At task box 1, each node computes topology and its local filtering database (FDB). The operation may be triggered by a node initialization or a topology change in one embodiment. In a SPB network, the forwarding topology is constructed using a distributed routing system where each node independently computes its local unicast and multicast FDB from the information in a routing system database. The routing system database is a repository of link state information of a network that will be common and synchronized across all routing nodes when the network is in a stable state. The consistency of the common repository is checked by exchanging a topology summary digest between neighboring nodes in the network. When the digest is the same, the nodes know that they share the same view of the network topology and have an explicit agreement on the distance to all roots in the network. Note each node has its own local FDB and the personalization exists because each node has a different position in the network. For example, after topology computation at nodes 3 and 5, both calculate the same shortest path tree (SPT) to root node 1, which is illustrated in the figure. Note that ports not on the SPT are not used so frames on the SPT will not be forwarded through these ports. Connections between node 5 and node 3, 4, and 6 are dashed lines with double bars in FIG. 1B. The notation symbolizes that the logical connectivity between the nodes is not used by that tree, even though the physical connections are intact.

Onward to task box 2, when node 5 receives a unicast frame with destination being node 1, it forwards the frame to node 2. Node 5 does not forward the frame to node 3, 4, or 6, even though they are also adjacent to node 5 because node 5 has its local FDB and knows that node 2 is on the shortest path for unicast frames destined to node 1.

At task box 3, when node 3 receives a unicast frame destined to node 1 from its port facing node 5 (due to e.g., malfunctioning), it discards the frame without forwarding. The discarding decision is made because node 3 knows that it is not on the shortest path of node 5 to root 1. On the other hand, if node 3 receives a unicast frame destined to node 1 from its port facing node 6, it forwards the frame (not shown in FIG. 1B). The check of incoming frames to determine whether the reception port is valid is referred to as ingress checking in the IEEE 802.1aq specification, also often referred to as reverse path forwarding check (RPFC) in the art. Note task box 2 and 3 do not need to occur at the order discussed. Node 3 makes the same RPFC decision before node 5 sending out frame to node 3 or after. In other words, node 3 makes its own RPFC decision based on its view of network 100 topology. While FIG. 1B illustrates one embodiment of RPFC in a SPBM network, RPFC is implemented in a SPBV network too. In a SPBV network, instead of checking source MAC addresses, RPFC checks port membership of a VLAN and incoming frames to only valid ingress ports for the shortest path VID (SPVID) are forwarded.

RPFC is utilized for multicast traffic too. Note that both unicast and multicast traffic for a given ECT set have the same chosen path in the forward and reverse directions between any given pair of nodes in the network, even when there are multiple equal cost candidate paths available. Thus, the shortest path shown to root node 1 for unicast traffic is the same shortest path to root node 1 for multicast traffic. The congruency is important as it ensures Ethernet operations, administration and management (OA & M) mechanism can function properly in a SPB network and frame ordering is preserved for all traffic.

VID or MAC based RPFC substantially improves protection against Ethernet forwarding loops. Indeed, since for a given root, RPFC allows a node to receive frames only a single ingress port, flows from two or more directions can never merge, and the probability of an instantaneous network meltdown is significantly reduced. Yet, the rigid enforcement of RPFC comes at a price, namely, RPFC prevents any rapid unilateral rerouting of traffic upon an abnormal condition as such a change would need to be synchronized between multiple nodes.

Figure 2:
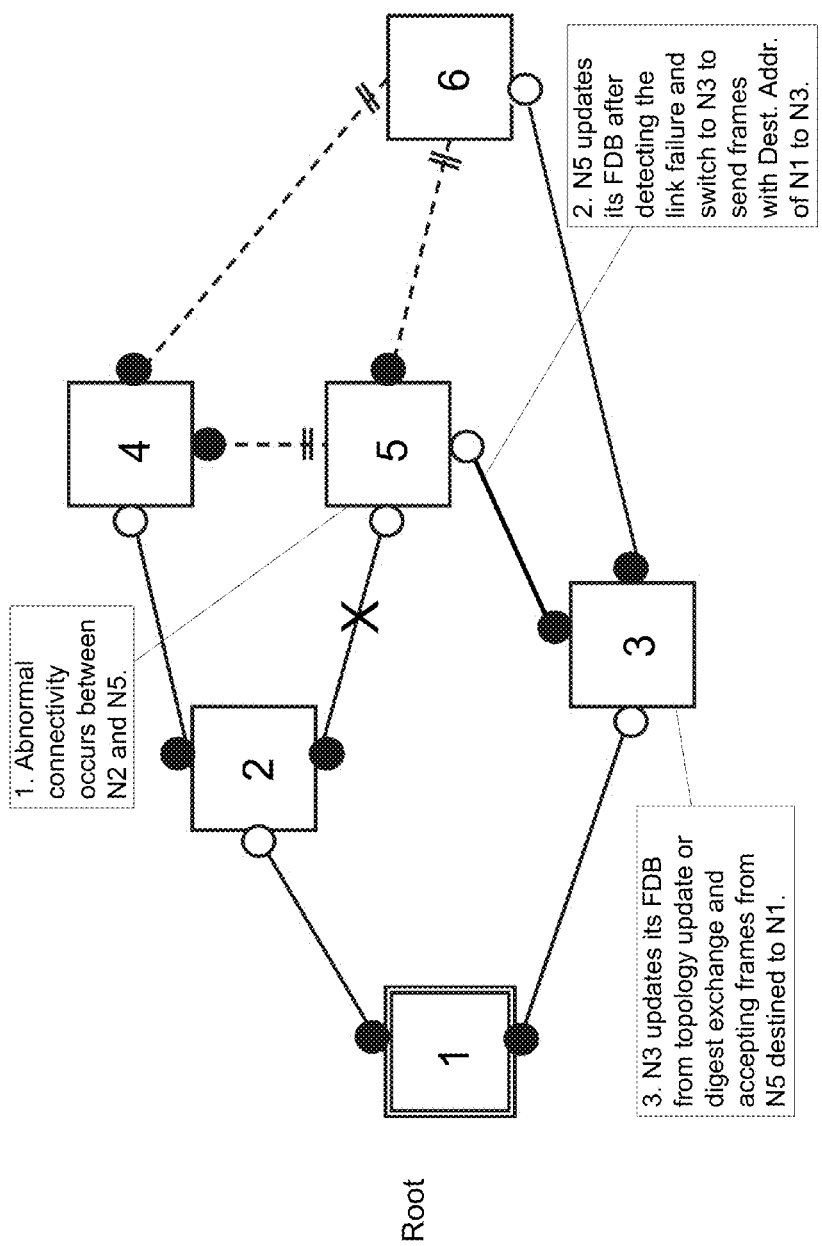
FIG. 2 is a block diagram illustrating frame forwarding upon a link failure in one embodiment of a SPB network.

FIG. 2 is a block diagram illustrating frame forwarding upon a link failure in one embodiment of a SPB network. Network 200 is similar to network 100 and the same or similar references indicate elements or components having the same or similar functionalities. Task boxes 1-3 illustrate the order in which operations are performed. Network 200 has the same shortest path spanning tree with node 1 being the root as network 100.

At task box 1, an abnormal connectivity at the link between node 2 and node 5 is detected at node 5. The abnormal connectivity detection may be triggered by link degradation/failure or node no-response/failure at the remote node (node 2 in this case) in one embodiment. Upon detecting the failure, node 5 performs task box 2 and it recalculates topology and extracts information to build its new local filtering database (FDB). From the recalculation, node 5 builds a new shortest path tree (SPT), where the shortest path for node 5 to node 1 goes through links to node 3 instead of the abnormal link to node 2. With the new SPT and the new FDB entries, node 5 now forwards frames destined to node 1 to node 3 instead of node 2. Yet, at node 3, a frame coming from node 5 destined to node 1 is discarded (not shown) because of RPFC discussed herein above.

Onward to task box 3, where node 3 is notified of topology change. Because node 3 is not immediately adjacent to the abnormal condition, likely node 3 is notified of the topology change later in time than node 5 detecting the abnormal condition. Node 3 performs the same topology recalculation as node 5 and node 3 also rebuild their FDBs. Afterward, node 3 realizes that it is on the shortest path of node 5 to node 1, then node 3 no longer discards frame frames destined to node 1 redirected from node 5.

The operation of network 200 is known in the art and it may be referred to as "break before make" as it does not preemptively calculates possible any alternative path in its topology calculation. As a result, traffic re-route takes time, and the delay can be significant, furthermore it causes frame loss, particularly as a SPB network supporting IEEE 802.1aq scales up to thousands of nodes and millions of services.

Implementing Unicast Loop Free Alternatives (LFAs)

Figure 3:
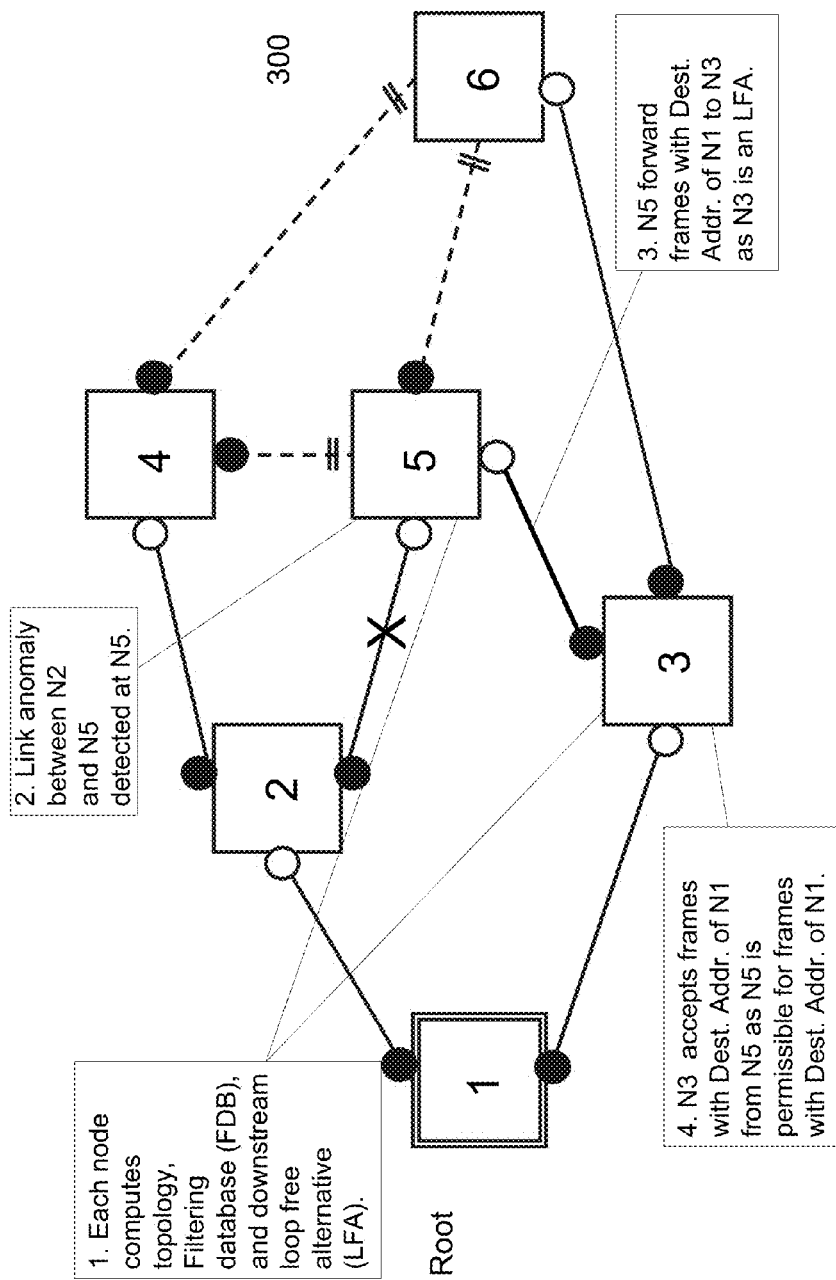
FIG. 3 is a block diagram illustrating a method implementing unicast loop free alternates (LFAs) according to one embodiment of the invention.

FIG. 3 is a block diagram illustrating a method implementing unicast loop free alternate (LFAs) according to one embodiment of the invention. Network 300 is similar to network 100 and the same or similar references indicate elements or components having the same or similar functionalities. Task boxes 1-4 illustrate the order in which operations are performed. Network 300 has the same shortest path tree with node 1 being the root as network 100.

At task box 1, each node computes topology, its local filtering database (FDB), and a downstream loop free alternate (LFA). The computation of topology and FDB is similar to task box 1 in FIG. 1B thus not repeated here. The extra computation of a downstream LFA is new and worth detail discussion. A loop free alternative path is a path not on a current shortest path tree of the computing node, but nevertheless is a loop free path to a given root. The immediately adjacent node to the computing node on the loop free alternative path is a loop free alternative node, or a loop free alternate. In the specification herein below, the terms "loop free alternative node" and "loop free alternate (LFA)" are used interchangeably unless noted otherwise. In a mesh SPB network, multiple paths may lead to a given root and LFA nodes exist in that case. This computation tries to find a downstream LFA, that is, a LFA node closer to the root than the computing node. Note in some topologies such a node may not exist, in others there may be a plurality of possible choices. In the presence of multiple choices, unlike most aspects of 802.1aq, the computing node and the LFA node are not required to make identical choices, freeing the computing node to use whatever criteria it chooses to select from the set of candidate LFA nodes. In the absence of other criteria, the candidate LFA node closest to the root would normally be the most robust choice from the point of view of mitigating looping and multiple failure scenarios. These computation operations are typically performed when the topology view/database has been already stabilized after a topology change, i.e. neighbors have matching digests.

In network 300, for example, at node 5, node 2 is on its chosen shortest path to root node 1 as illustrated. Nodes 3, 4, and 6 are not on the chosen shortest path. Yet nodes 3, 4, and 6 are LFA nodes for node 5 as selecting one of them do not lead to a forwarding loop. For example, a path goes node 5-node 4-node 2-node 1 do not create a loop and it is a valid alternate to the chosen path goes node 5-node 2-node 1. However, nodes 4 and 6 are not a "downstream" LFA for node 5 to root node 1, assuming each link carries the same cost/weight. That is because node 5 is two hops away from root node 1, and both nodes 4 and 6 are also two hops away from root node 1. On the other hand, node 3 is only a single hop away from root node 1 thus out of LFA nodes 3, 4, and 6, node 3 is selected as the only downstream LFA through task box 1. Note when there are multiple downstream LFAs, a single LFA is selected through task box 1. The LFA selection of node 3 is saved by node 5, along with other FDB information.

Onward to task box 2, where node 5 detects an abnormal connectivity to node 2. An abnormal connectivity detection may be triggered by link degradation/failure or node no-response/failure at the remote node (node 2 in this case) in one embodiment. Upon detecting the failure, node 5 immediately redirects frame destined to root node 1 to the preselected LFA, node 3, without performing any recalculation. Note the immediate redirection of frame forwarding is in contrast to task box 2 of FIG. 2, where the frame forwarding is not performed until a new computation of topology is completed.

At task box 3, node 3 now receives frames forwarded from node 5, these frames are destined to node 1. Instead of performing RPFC as discussed herein above, node 3 now no longer discards unicast frames redirected from node 5. In one embodiment, node 3 simply does not employ RPFC for unicast frames (identifiable via the M-bit encoded in the destination MAC address), thus incoming unicast frames from node 5 or any other nodes are accepted and then forwarded. In another embodiment, node 3 performs additional tasks of discarding some unicast frames while allowing other unicast frames from a set of assumed safe nodes for the given destination to be processed for forwarding.

Note that in network 300, recovery from link/node failure is much faster than the recovery of network 200. The fast recovery upon failure is referred to as fast re-route (FRR) in this specification. The calculation of LFA is performed at the initial topology computation stage and it is a by-product of finding the all pairs shortest path computation performed by the 802.1aq control plane, thus the additional finding of LFA does not consume significant additional computing resources. The LFA information can be used immediately after a topology change due to a link or node failure. In a scaled SPB network, the efficiency of network convergence makes implementation of unicast LFA through the additional computation worthwhile.

Implementation of Unicast LFAs at the Point of Local Repair (PLR)

Figure 4:
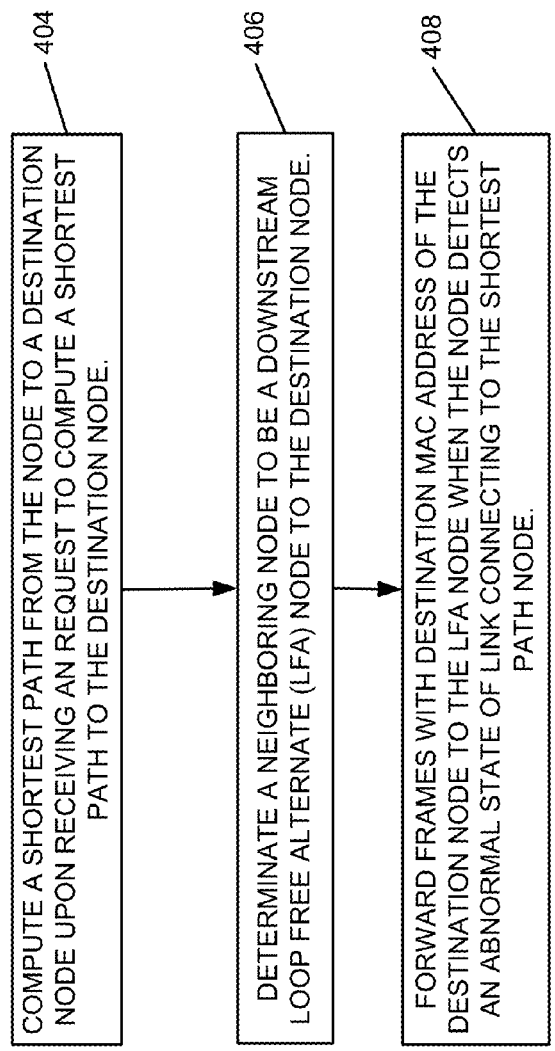
FIG. 4 is a flow diagram illustrating a method implementing unicast LFAs at the point of local repair (PLR) according to one embodiment of the invention.

FIG. 4 is a flow diagram illustrating a method of implementing unicast loop free alternates (LFAs) at the point of local repair (PLR) according to one embodiment of the invention. In this specification, a PLR is a node immediately adjacent to a link failure. In FIG. 3 for example, node 5 is a PLR for network 300 (as it is immediately connected to the failed link between nodes 2 and 5), thus method 400 may be implemented on node 5 of FIG. 3.

Referring to FIG. 4, at reference 404, a node computes a shortest path from the node to a destination node upon receiving a request to compute a shortest path to the destination node. The request may be triggered by a detected or notified topology change of a network. The computation is based on a common repository of link state information of the network in one embodiment. The neighboring node on the shortest path to reach each root node is recorded in the computation. At reference 406, the computing node also computes a downstream loop free alternate node to the destination. As discussed herein above, a downstream LFA node is a neighboring node that is downstream of the computing node with respect to a root, shares a synchronized view of the network, and therefore is also is a valid transit node to reach the destination without causing forwarding loops. Note while references 404 and 406 are referred as two separate steps to particularly point out the extra calculation comparing to a regular topology computation, in some embodiments, the two steps are performed simultaneously. In other words, the determination of downstream LFA is performed at the same time as the shortest path calculation. The determined LFA and the calculated shortest path are then saved at the computing node.

At reference 408, when the computing node detects an anomaly of a link connecting to the shortest path to a root, the computing node switches to the LFA node for all frames destined to the root (as shown by the destination MAC address of the frames). The anomaly may be caused by the link degradation/failure in one embodiment. In another embodiment, the anomaly may be caused by node failure or non-response after a period of time at the remote node. Additionally, the PLR node may notify other nodes in the network that a topology change has occurred.

Note that a node may find a number of ECTs for a given root each in a distinct ECT set. In that case, method 400 is performed the number of times, and it tries to find a LFA node for each ECT for a given root. Upon detecting an abnormal connectivity to a link to a neighboring node to the shortest path of a set of ECT, the computing node redirects frames destined to the root to the LFA node for the ECT. Also note that an LFA may not be available for that destination in any ECT set—there either is or isn't at the granularity of destination, if one ECT set has an alternate then the rest ECT sets will do too. When there is no LFA available, upon a link anomaly, the computing node has to recalculate new network topology as illustrated in FIG. 2 for example and cannot participate in enhanced recovery.

Method 400 can be implemented in a SPBM network because the ingress checking (often referred to as RPFC) treatment of multicast can be made distinct from that for unicast.

Implementation of Unicast LFAs at a Loop Free Alternative (LFA) Node

Figure 5:
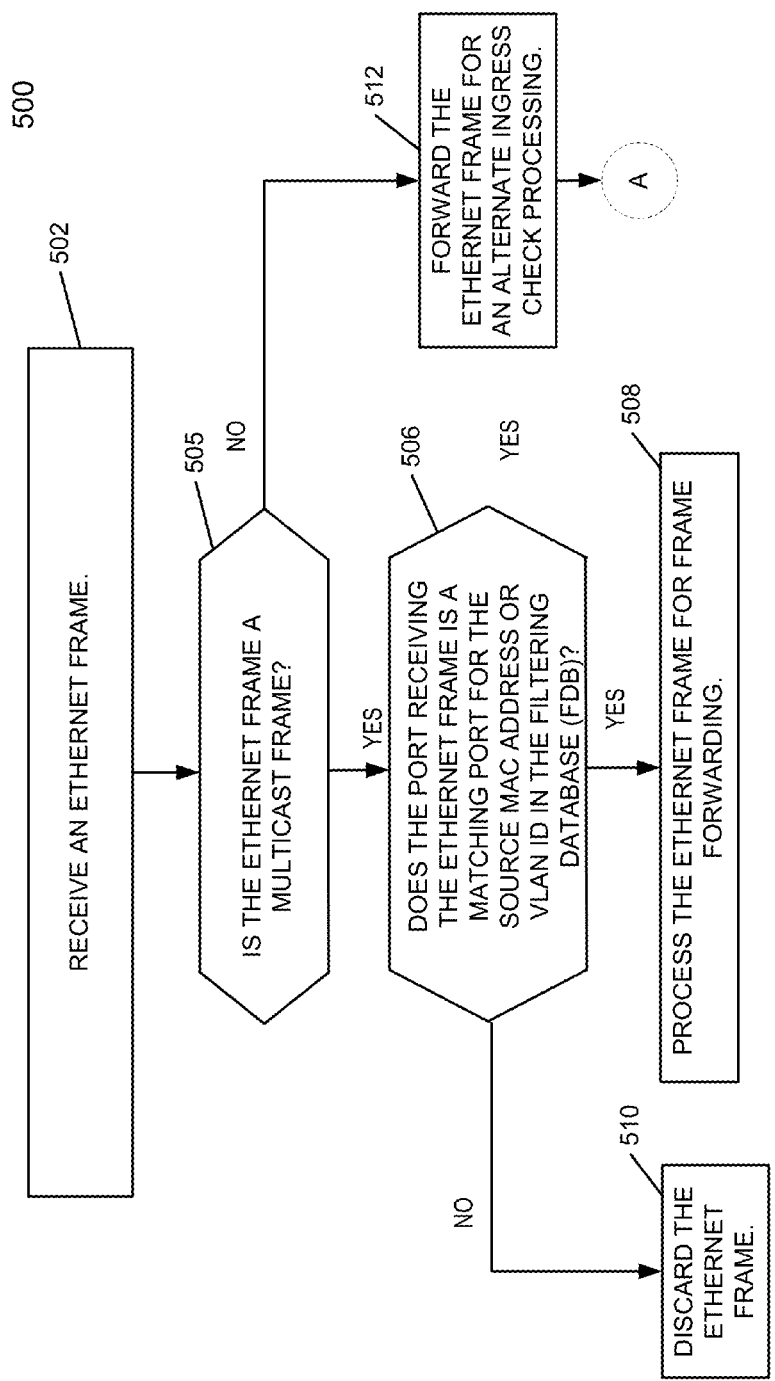
FIG. 5 is a flow diagram illustrating a method implementing unicast LFAs at a chosen LFA node according to one embodiment of the invention.

FIG. 5 is a flow diagram illustrating a method implementing unicast loop free alternates (LFAs) at a chosen LFA node according to one embodiment of the invention. In FIG. 3 for example, node 3 is a chosen LFA of node 5 and method 500 may be implemented on node 3 of FIG. 3. Referring to FIG. 5, at reference 502, a node receives an Ethernet frame. The node determines whether the received Ethernet frame is a multicast frame at reference 505. The determination may be based on the frame header of the received Ethernet frame, and in one embodiment, the node checks an "M" bit of the destination MAC address in frame header to make the determination. If the received Ethernet frame is a multicast frame, the node performs RPFC processing. That is, the node determines at reference 506 if the receiving port is a matching port to the source MAC address of the received Ethernet frame in the filtering database (FDB). If the source MAC address of the received Ethernet frame is not from a matching port per FDB, the received frame is discarded at reference 510. Otherwise, the received multicast frame is processed for frame forwarding at reference 508.

Referring back to reference 505, if the node determines the received Ethernet frame is not a multicast frame, the received Ethernet frame is forwarded for an alternate ingress check processing at reference 512. In other words, method 500 performs RPFC for multicast frame, but not for unicast frame. The relaxation of RPFC allows a SPB node to consider more frames acceptable for forwarding than is currently allowed by ingress checking under IEEE 802.1aq. Intuitively, the relaxation comes at a cost. Specifically, without enforcing RPFC, multiple failure scenarios may result in a forwarding loop. Yet as discussed herein above, the worse forwarding loop is caused by multicast frame forwarding without RPFC as a loop may feed into another loop thus cause an instantaneous network meltdown. Since method 500 does enforce RPFC for multicast frame, the risk of network meltdown is mitigated. In addition, for unicast traffic, method 500 can be further enhanced. Note further that only using downstream LFAs for unicast does not increase the risk of loops due to the basic Ethernet forwarding, i.e. frames are not sent back on the reception port.

Figure 6:
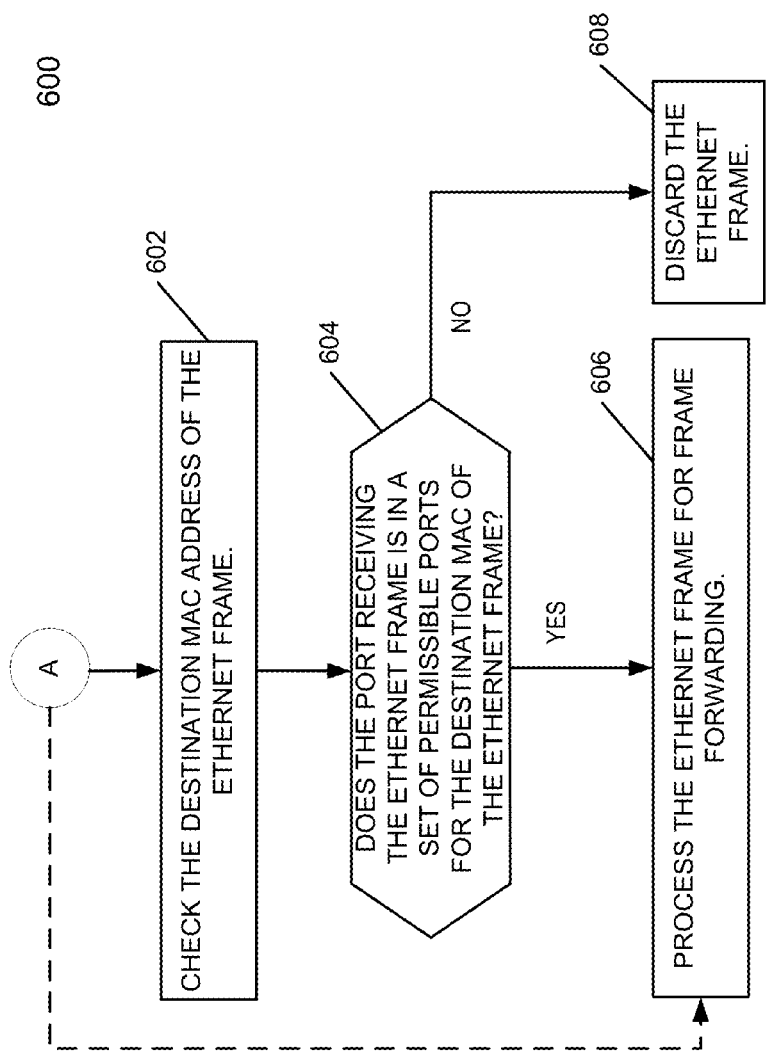
FIG. 6 is a flow diagram illustrating a method implementing LFAs at a chosen LFA node according to one embodiment of the invention.

FIG. 6 is a flow diagram illustrating a method implementing unicast loop free alternates (LFAs) at a chosen LFA node according to one embodiment of the invention. Method 600 follows method 500 for processing unicast frame as the process of method 500 ends at reference A as illustrated in FIG. 5 and reference A is the starting point of method 600 in FIG. 6. Similar to method 500, method 600 may be performed at a chosen LFA node such as node 3 in FIG. 3.

Referring to FIG. 6, a node may directly process the received unicast frame for frame forwarding at reference 606. That is, the received unicast frame is forwarded without any further filtering to mitigate forwarding loops. Alternatively, the node may check the destination MAC address of the received unicast frame at reference 602. The node then determines whether the receiving port is in a set of permissible ports for the destination MAC address at reference 604 where the set of permissible ports is that determined to be upstream of the node and with nodes for which current agreement in database digests exists (note that this port set would be common to all ECT sets for a given routing topology). In one embodiment, the set of permissible ports are stored in an admissible port map. If the port is in the set of permissible ports for the destination MAC address, the frame is processed for frame forwarding at reference 606, otherwise the frame is discarded at reference 608. In other words, a received unicast frame is not processed for frame forwarding unless it is received from one of a set of permissible ports for the frame's destination which is the set explicitly known to be connected to upstream nodes on the shortest path tree for the given destination. The added check at reference 604 further mitigates forwarding loops. Intuitively, the absence of a check on the set of permissible ports for a given destination MAC address means the less filtering/processing the node has to do, yet the more likely that forwarding loops may occur. Thus, the key is to select an optimal set of permissible ports for a given destination MAC address such that the node is not required to do exhaustive computation while keep forwarding loops low at the same time.

Figure 7:
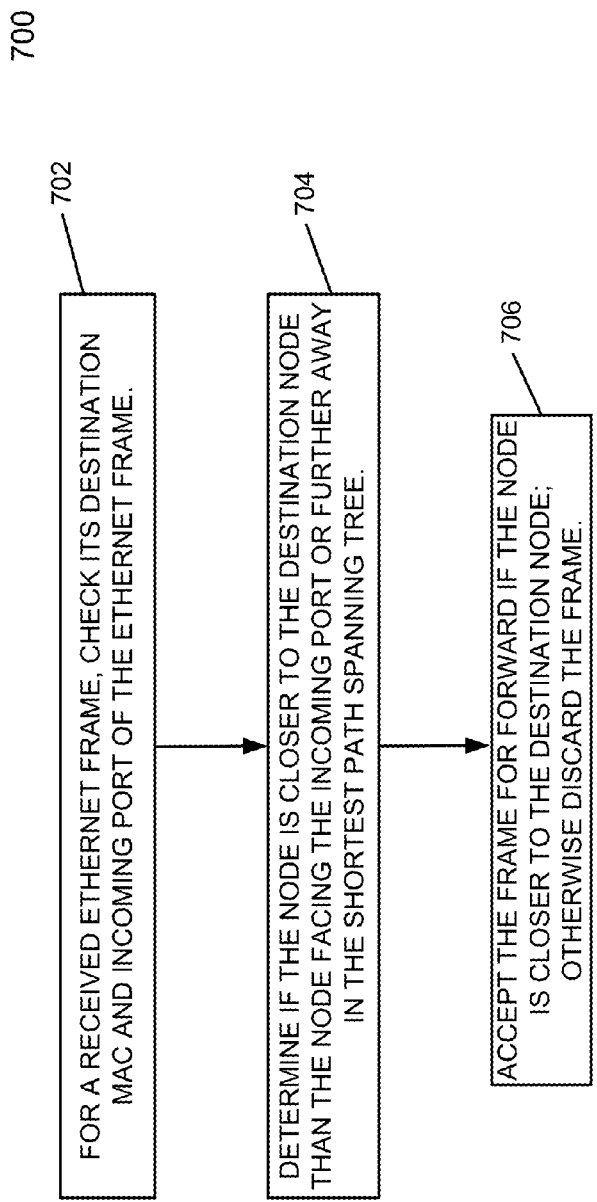
FIG. 7 is a flow diagram illustrating a method selecting a set of permissible ports at a chosen LFA node according to one embodiment of the invention.

FIG. 7 is a flow diagram illustrating a method selecting a set of permissible ports at a chosen LFA node according to one embodiment of the invention. Method 700 may be performed at a chosen LFA node such as node 3 in FIG. 3. At reference 702, the node checks a received Ethernet frame and determines its destination MAC address and the incoming port. Then at reference 704, the node had a priori determines if it is closer to the destination of the received frame than the node facing the incoming port on the shortest path tree it is using for frame forwarding. In other words, the node determines whether or not it is downstream of the node it receiving the frame from (may be referring to as a neighboring sending node) with regard to the root (destination node). At reference 706, the node accepts the received frame for frame forwarding if the node is closer to the destination node (thus in downstream of the neighboring sending node), otherwise, the received frame is discarded. That is, the node only accepts a received frame for frame forwarding if the received frame is from a node upstream of the node with respect to the root. The updated set of safe ports then can be used to accept or discard future incoming frames. When a topology change occurs, non PLR nodes for a given ECT compare the PLR position with the previous distance from the root for all upstream nodes it does NOT have database synchronization with, and removes those from the acceptable set that there is a risk that they are now downstream. As database synchronization is re-achieved with these nodes, the set can then again be revised accordingly.

Figures 8A, 8B:
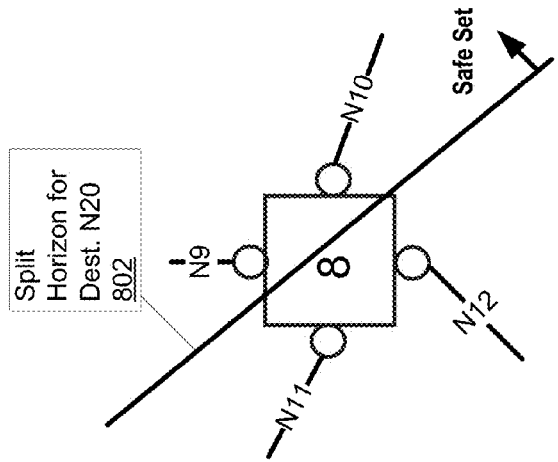
FIG. 8A is block diagrams illustrating another method selecting a set of permissible ports at a chosen LFA node according to one embodiment of the invention.
FIG. 8B is block diagrams illustrating a split horizon port table at a chosen LFA node according to one embodiment of the invention.

FIG. 8A is block diagrams illustrating another method selecting a set of permissible ports at a chosen LFA node according to one embodiment of the invention. In FIG. 8A, a node (node 8, or N8) splits its ports into two groups. The splitting (referred to as "split horizon") for a given destination (destination being node 20 (N20) as shown at reference 802) is based on whether a port is facing a node further away from N20 or not, in comparing to the computing node (N8). If the incoming node is further away from N20 than N8, the port facing the incoming node is safe for frame forwarding, otherwise it is not. In this example, nodes 9 and 10 are further away from node 20 than N8, thus ports connecting to nodes 9 and 10 are in the safe set of ports while ports connecting to nodes 11 and 12 are not.

FIG. 8B is block diagrams illustrating a split horizon port table at a chosen LFA node according to one embodiment of the invention. The split horizon port table is for node 8, and it contains a row for destination nodes. The row may contain a column for each node in the SPB network except the computing node (node 8 in this case). The table contains another row for upstream ports (i.e., safe ports) facing nodes for a given destination node. The table may also contain another row for non-upstream ports (i.e., unsafe ports) facing node for the given destination node. The first column is for destination node 20. As shown in FIG. 8A, ports connecting to nodes 9 and 10 are in the entry of upstream ports while ports connecting to nodes 11 and 12 are in the entry of non-upstream ports. Note the table is for illustration only, and a safe set table may keep records of ports only instead of nodes connecting to the ports. Also note that there are many ways to construe a split horizon in building a safe set of ports. The safe set of ports can be a table, array, tuple, or other data structures using the same principle illustrated in FIGS. 8A-B.

Figure 9:
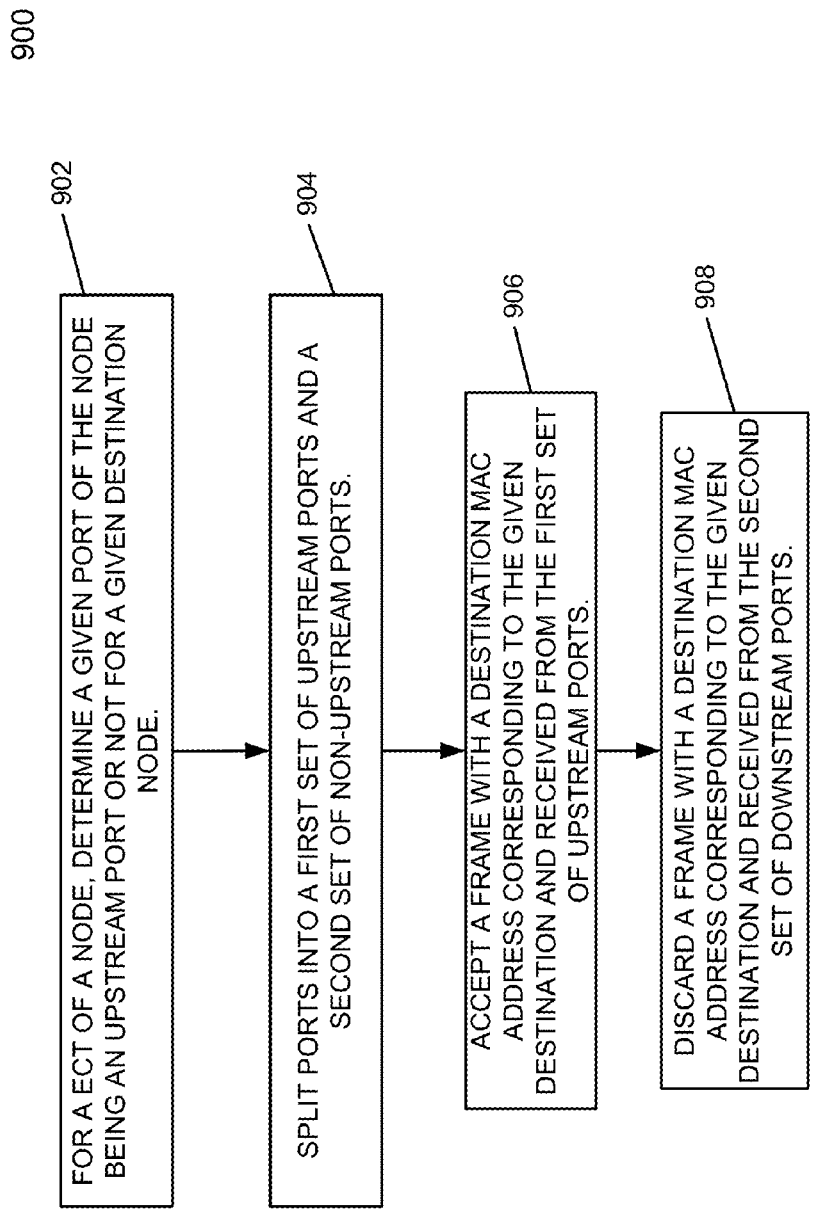
FIG. 9 is a flow diagram illustrating creation of port split horizon at a chosen LFA node according to one embodiment of the invention.

FIG. 9 is a flow diagram illustrating creation of port split horizon at a chosen LFA node according to one embodiment of the invention. Method 900 may be performed at a chosen LFA node such as node 3 in FIG. 3. At reference 902, for an ECT of a node for a given destination, the node ("computing node") determines a given port being an upstream port or not. The port is an upstream port if the port faces a node that is further away to the destination than the computing node. At reference 904, the node splits all ports into two sets for the given destination, the first set being upstream ports and the second set being non-upstream ports (including both downstream ports and ports facing nodes at equal distance to the destination). Then at reference 906, the node accepts a frame to the destination node for frame forwarding when the frame arrives at the first set (upstream) ports. At reference 908, the node discards a frame to the destination node when the frame arrives at the second set (non-upstream) ports.

Embodiments of Network Devices Implementing Unicast LFAs

Figure 10:
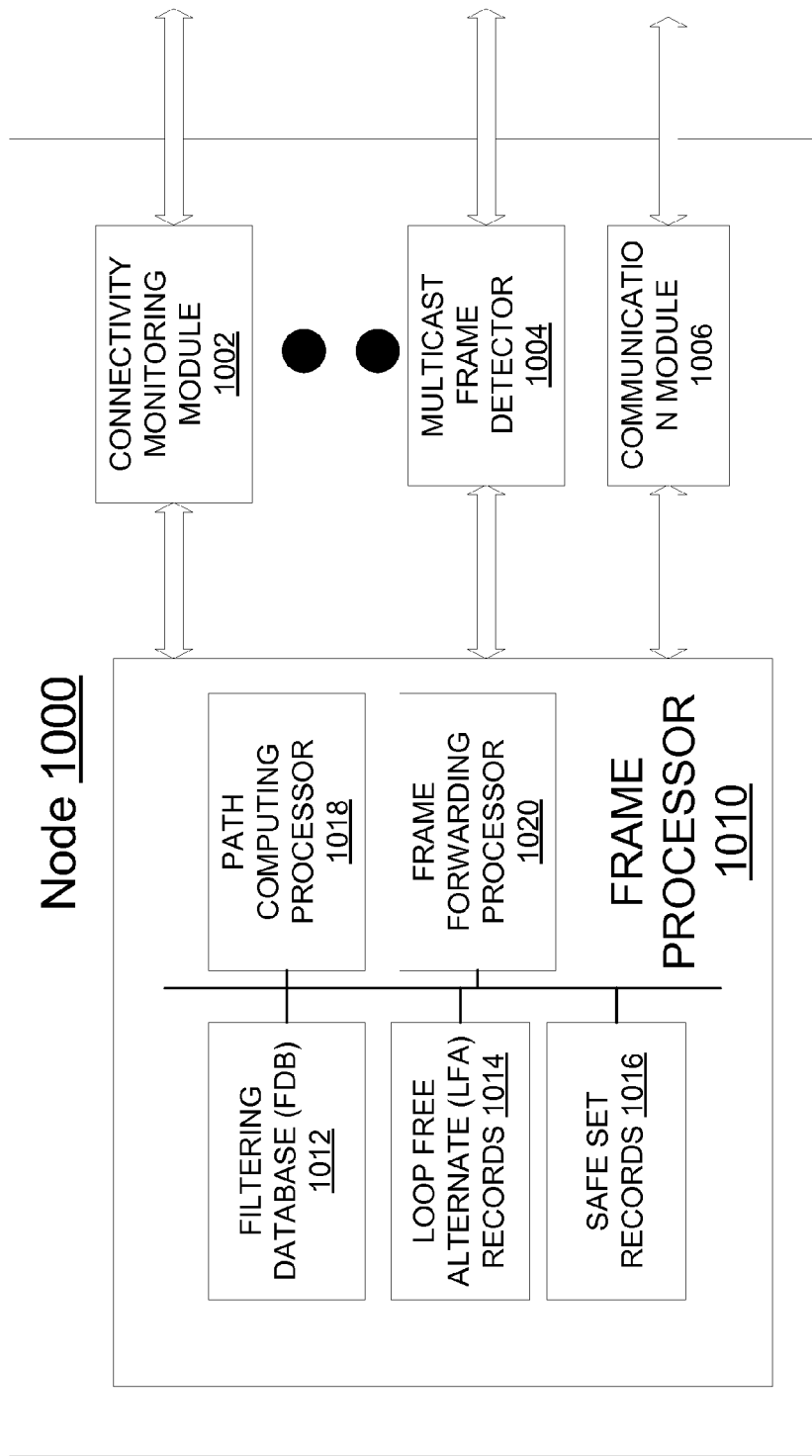
FIG. 10 is a block diagram illustrating a network device serving as a node implementing unicast LFA according to one embodiment of the invention.

FIG. 10 is a block diagram illustrating a network device serving as a node implementing unicast loop free alternate according to one embodiment of the invention. In one embodiment, the network device includes a set of one or more line cards/processor (e.g., connectivity monitoring module 1002, multicast frame detector 1004, and communication module 1006), a set of one or more control cards (e.g., frame processor 1010), and optionally a set of one or more service cards (sometimes referred to as resource cards). These cards are coupled together through one or more mechanisms (e.g., a first full mesh coupling the line cards and a second full mesh coupling all of the cards). The set of line cards make up the data plane, while the set of control cards provide the control plane and exchange packets with external network device through the line cards. Note that embodiments of this invention apply where the control plane and data plane are in separate network devices. Not only modules/processors relates to the embodiment are shown for illustration and other modules/processors are required for the node to function properly.

Node 1000 may contain connectivity monitoring module 1002 configured to monitor connectivity to neighboring nodes. Module 1002 detects link abnormality. For example, module 1002 may detect link degradation/failure or remote node failure/being otherwise nonresponsive after a period of time. Module 1002 notifies link abnormality to frame processor 1010. Node 1000 may also contain multicast frame detector 1004 determines whether an incoming frame is a multicast frame. The determination is important as node 1000 may enforce RPFC for multicast frames while relax RPFC for unicast frames. Additionally node 1000 may contain communication module 1006 to communicate with rest of nodes of the network. For example, communication module 1006 may perform topology summary digest exchange with neighboring nodes.

Node 1000 contains frame processor 1010. Frame processor 1010 is a physical processor and it may contain path computing processor 1018 and frame forwarding processor 1020. Path computing processor 1018 computes a shortest path to a given destination. It may also compute loop free alternates and determine which loop free alternate is in the downstream of node 1000 to the destination. Frame forwarding processor 1020 processes a frame for forwarding and it also discard a received frame when it is not safe to forward. Filtering database (FDB) is a local database computed from a common repository of link state information of the network. The FDB is based on the node's position in the network. Loop free alternate (LFA) records 1014 saves the computed LFAs for a given destination. Safe set records 1016 saves the set of safe ports for a given destination. Note FDB 1012, LFA records 1014, and safe set records 1016 may be implemented outside of frame processor 1010. In addition, frame processor 1010 can be general purpose or special purpose processors. The individual modules in network processor 1010 can contain their dedicated network process units (NPU) or they can share NPUs among multiple modules. For example, path computing processor 1018 and frame forwarding processor 1020 may share a same NPU.

Node 1000 may function as a SPB node at the point of local repair (PLR). In one embodiment, path computing processor 1018 computes shortest paths to other nodes of the network upon detected or notified topology change. Path computing processor 1018 also selects downstream LFAs and save the selected downstream LFAs to LFA records 1014. Note a set of ECTs may be found to other nodes. Then path computing processor 1018 saves the local forwarding configuration for all computed ECT sets to FDB 1012. In addition, path computing processor 1018 saves selected downstream LFAs for each destination for each ECT to LFA records 1014. When downstream LFAs is non-existent for a destination of a computed ECT, no LFA record is save for the destination of the computed ECT. In one embodiment, the sets of LFA records to be invoked by a failure are indexed by the ports they will be invoked in response to a connectivity abnormality.

Then, upon connectivity monitoring module 1002 detects a connectivity abnormality at the connection to the shortest path node, frame forwarding processor 1018 forwards an incoming frame to its destination through the LFA retrieved from LFA records 1014. Additionally, through communication module 1006, node 1000 notifies other nodes in the network that the topology of the network has changed.

Node 1000 may function as a SPB node at a selected LFA node. In one embodiment, multicast frame detector 1004 determines whether an incoming frame is a multicast frame. If the incoming frame is a multicast frame, RPFC applies, and node 1000 checks FDB 1012 and determines whether the port receiving the Ethernet frame is a matching port for the source MAC address. If it is, the receiving multicast frame is processed for frame forwarding by frame forwarding processor 1018. If not, the received multicast frame is discarded. In one embodiment, if the incoming frame is a unicast frame, node 1000 puts the frame to frame forwarding processor 1018 for frame forwarding directly. In another embodiment, the frame processor 1010 checks and sees if the incoming port is in a safe set of ports for the specified destination at the unicast frame by checking safe set record 1016. If the incoming port is in the safe set of ports for the specified destination, the frame is forwarded to frame forwarding processor 1018 for frame forwarding, otherwise the frame is dropped.

In one embodiment, the safe set records 1016 is formed by applying split horizon on ports of node 1000. In split horizon calculation, for each destination, a port is categorized as being upstream port or not, and upstream ports are considered safe to accept incoming frame for a given destination while non-upstream ports are unsafe.

While the flow diagrams in the figures herein above show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method to forward Ethernet frames at a node in a network supporting an implementation of shortest path bridging (SPB) protocol, wherein each Ethernet frame contains a source and a destination media access control (MAC) address, wherein the node contains a plurality of ports to receive and forward Ethernet frames, wherein the node contains a filtering database (FDB) to guide Ethernet frame forwarding, wherein FDB update is coordinated through a digest exchange between the node and one or more neighboring nodes, and wherein the FDB contains a plurality of mappings of ports to MAC addresses, the method comprising:

upon receiving an Ethernet frame from a port of the node, determining whether the Ethernet frame is a multicast frame;

upon determining the Ethernet frame is a multicast frame, examining a source MAC address in the Ethernet frame to determine for the port whether in the FDB the source MAC address has a matching MAC address;

processing the Ethernet frame for frame forwarding in response to determination that a matching MAC address for the port is found in the FDB for the Ethernet frame;

discarding the Ethernet frame in response to determination that no matching MAC address for the port is found in the FDB for the Ethernet frame; and upon determining the Ethernet frame is not a multicast frame, sending the Ethernet frame for an alternate ingress check processing, wherein the alternate ingress check processing comprises:

checking a destination MAC address of the Ethernet frame;

determining whether the port belongs to a set of permissible ports for the destination MAC address of the Ethernet frame, wherein the set of permissible ports of the node for the destination MAC address is selected through (i) determining each port of the node is an upstream port or not for a destination node; and (ii) splitting all ports of the node into two sets for the destination node, wherein a first set of the two sets being upstream ports and a second set of the two sets being non-upstream ports, wherein the upstream ports are the set of permissible ports for a destination node facing a set of nodes that are further from the destination node indicated by the destination MAC address than the node;

processing the Ethernet frame in response to determining that the port is in the set of permissible ports for the destination MAC address; and discarding the Ethernet frame in response to determining that the port is not in the set of permissible ports the destination MAC addresses.

2. The method of claim 1, wherein the implementation of SPB protocol is an implementation of shortest path bridging—MAC (Media Access Control) mode (SPBM) protocol.

3. The method of claim 1, wherein the set of permissible port is stored in an admissible port map.

4. The method of claim 1, wherein determining whether the Ethernet frame is a multicast frame is through checking a bit in a frame header of the Ethernet frame.

5. A non-transitory computer-readable storage medium having instructions stored therein, which when executed by a processor, cause the processor to perform operations in an electronic device to forward Ethernet frames at a node in a network supporting an implementation of shortest path bridging (SPB) protocol, wherein each Ethernet frame contains a source and a destination media access control (MAC) address, wherein the node contains a plurality of ports to receive and forward Ethernet frames, wherein the node contains a filtering database (FDB) to guide Ethernet frame forwarding, wherein FDB update is coordinated through a digest exchange between the node and one or more neighboring nodes, and wherein the FDB contains a plurality of mappings of ports to MAC addresses, the operations comprising:

upon receiving an Ethernet frame from a port of the electronic device, determining whether the Ethernet frame is a multicast frame;

upon determining the Ethernet frame is a multicast frame, examining a source MAC address in the Ethernet frame to determine for the port whether in the FDB the source MAC address has a matching MAC address;

processing the Ethernet frame for frame forwarding in response to determination that a matching MAC address for the port is found in the FDB for the Ethernet frame;

discarding the Ethernet frame in response to determination that no matching MAC address for the port is found in the FDB for the Ethernet frame; and upon determining the Ethernet frame is not a multicast frame, sending the Ethernet frame for an alternate ingress check processing, wherein the alternate ingress check processing comprises:

checking a destination MAC address of the Ethernet frame;

determining whether the port belongs to a set of permissible ports for the destination MAC address of the Ethernet frame, wherein the set of permissible ports of the node for the destination MAC address is selected through:

(i) determining each port of the node is an upstream port or not for a destination node; and (ii) splitting all ports of the node into two sets for the destination node, wherein a first set of the two sets being upstream ports and a second set of the two sets being non-upstream ports, wherein the upstream ports are the set of permissible ports for a destination node facing a set of nodes that are further from the destination node indicated by the destination MAC address than the node;

processing the Ethernet frame in response to determining that the port is in the set of permissible ports for the destination MAC address; and discarding the Ethernet frame in response to determining that the port is not in the set of permissible ports the destination MAC addresses.

6. The non-transitory computer-readable storage medium of claim 5, wherein the implementation of SPB protocol is an implementation of shortest path bridging—MAC (Media Access Control) mode (SPBM) protocol.

7. The non-transitory computer-readable storage medium of claim 5, wherein the set of permissible port is stored in an admissible port map.

8. The non-transitory computer-readable storage medium of claim 5, wherein determining whether the Ethernet frame is a multicast frame is through checking a bit in a frame header of the Ethernet frame.

* * * * *